July 16, 1940.  G. F. SCHERER  2,208,394
NONGALLING PLUG VALVE
Filed Aug. 26, 1938
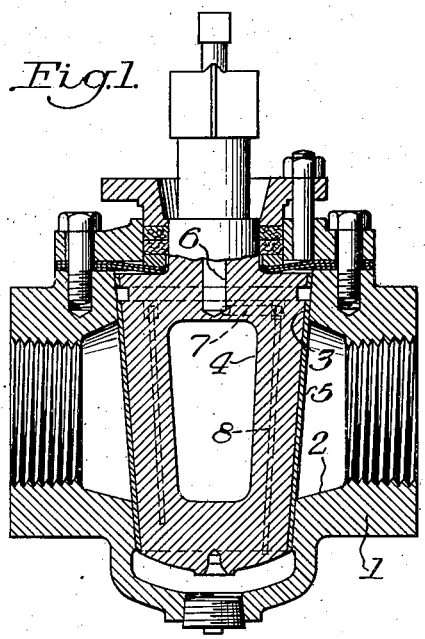
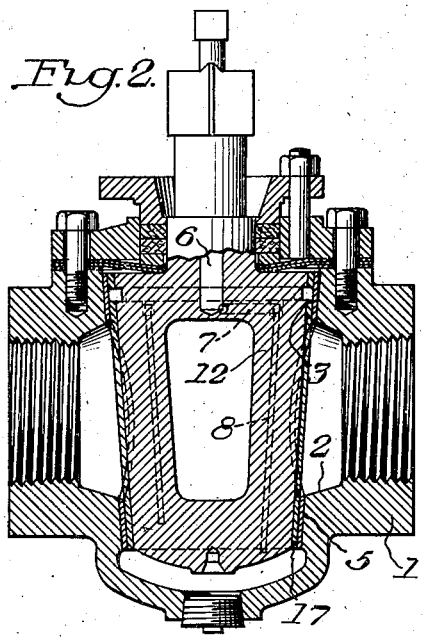
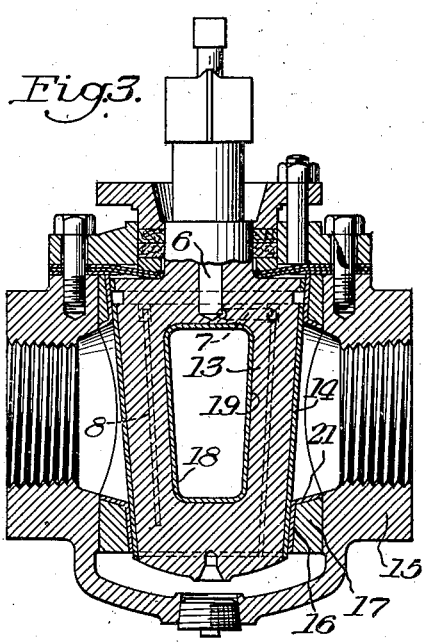
INVENTOR.
George F. Scherer.
BY Lewis D. Konigsford
ATTORNEY.

Patented July 16, 1940

2,208,394

UNITED STATES PATENT OFFICE 2,208,394

NONGALLING PLUG VALVE

George F. Scherer, San Francisco, Calif., assignor to Merco Nordstrom Valve Company, Pittsburgh, Pa., a corporation of Delaware Application August 26, 1938, Serial No. 226,961

3 Claims. (Cl. 251—101)

In the manufacture of steel plug valves it heretofore has been proposed to overcome the characteristic property of the steel plug and seat to seize or gall by employing a hardened steel plug, and a soft steel seat, for example, the plug being hardened by quenching or being case hardened by carburizing or nitriding. However, such valves are not satisfactory for services where they are subject to temperatures at which the hardness is decreased or lost, as the valve thereupon reverts to its tendency to gall. This galling characteristic is also accentuated at elevated temperatures in lubricated plug cocks by even a slight loss in hardness because at such temperatures the reduced viscosity of the lubricant may permit intimate metal to metal contact of the plug and seat.

According to the present invention, the galling in plug valves is overcome by coating the seating surfaces of the steel plug or seat, or both, with a hard, nongalling metal which retains its nongalling properties at elevated temperatures and which preferably is corrosion resistant. The various non-ferrous cobalt-chromium-tungsten welding alloys are especially valuable for this purpose, as they are extremely hard, maintain their hardness practically unimpaired up to about 1000° F., and with slight impairment at temperatures up to 1500° F. or higher, and are extremely resistant to corrosion, being in the same general corrosion resisting range as the chromium nickel stainless steels. They possess distinct nongalling characteristics either in contact with a surface of the same composition or any of the several cobalt-chromium-tungsten alloy variants or in contact with ordinary carbon steel or chromium nickel steel, probably due to their exceedingly low co-efficient of friction, which is lower than other metals.

The invention will be described in connection with the accompanying drawing wherein I have shown by way of example preferred embodiments of my invention, and wherein:

Figure 1 is a sectional view of a plug valve having a coating of hard nongalling metal on the plug, Figure 2 shows a modified construction having a coating of hard nongalling metal on the plug and seat, and Figure 3 shows a further modification having a coating on the plug and seat.

Referring to the drawing, Figure 1, there is shown a body 1 made of ordinary cast carbon steel. A plug 4 is located in the seat 3 and has a coating 5 on its surface of an alloy containing about 45 to 52%, cobalt, 28 to 32% chromium, 10 to 15% tungsten and about 2.5% carbon. The alloy coating 5 preferably is built up on the valve plug surface, which previously has been heated to a suitable temperature, by any suitable fusion welding method. The alloy flows readily when melted and is evenly distributed over the plug surfaces and forms an excellent bond therewith. The coated plug is then slowly cooled in a furnace to prevent cracks and to maintain a perfect bond. The thickness of the coating may range from a few thousandths of an inch up to any desired thickness. Preferably the alloy coating employed is about $\frac{3}{32}$ of an inch thick before grinding. The plug is then ground to the proper final dimension, then lapped into its seat at normal or elevated temperatures. The bond obtained in this manner between the alloy and the plug is excellent and there is no spalling off of the alloy surface. The alloy coating provides nongalling characteristics at both normal and elevated temperatures, along with corrosion resistance of the same order as the KA-2-S variety of stainless steel and excellent erosion resisting properties. Any suitable lubricating system may be employed for lubricating the seat 3 of the valve, the system illustrated comprising a reservoir 6 in the stem having radial ducts 7 communicating with longitudinal grooves 8 in the plug surface. The grooves may be ground into the alloy coating, or may be previously formed in the plug deep enough to receive an alloy coating.

In the modification shown in Figure 2 the alloy coat 17 is welded to the plug surface, and an alloy coating 5 is welded on the surface 3 of the casing. The alloy surfaces then are ground and the plug is lapped into its seat.

The most common cobalt-chromium-tungsten alloys are the following:

|   | Percent Co | Percent Cr | Percent W | Percent C | Ni | Mo |
|---|---|---|---|---|---|---|
| A | 45-52 | 28-32 | 10-15 | 2.5 | | |
| B | 48-53 | 28-32 | 12-16 | 2.5 | | |
| C | 63-68 | 27-30 | 2.6 | | | |
| D | 52-58 | 30-34 | 6.10 | | | |
| E | 45-50 | 25-30 | 15-20 | 2.5 to 2.75 | | |
| F | 38 | 30 | 16 | 2.5 | 10 | 4 |

The alloy coatings may be welded to steel or iron sleeves which are then keyed to either or both the plug and body. This is desirable mainly for the larger sizes of valves in order to secure more uniform expansion and contraction strains in the metal base to which the welded coating is applied. A further advantage of this construction is that when the alloy coating becomes worn the sleeve may be removed and a new coated sleeve then inserted.

In the modification shown in Figure 3, the valve plug 13, which may be of carbon steel, is coated with a coating 14 of an alloy containing 45 to 52% cobalt, 28 to 32% chromium, 10 to 15% tungsten, and about 2.5% carbon, and the casing 15, which is of ordinary carbon steel, has a tapered sleeve 17 of carbon steel secured therein in any suitable manner and having a coating 16 of an alloy containing about 52 to 58% cobalt, 30 to 34% chromium, and 6 to 10% tungsten. In this modification an alloy coating 18 preferably is formed around the plug port 19 and a coating 21 preferably is formed around the valve passage in order to provide protection against corrosion and erosion.

In plug valves, wherein the plug surface slides over the seat surface, the maintenance of proper seating surfaces is of the utmost importance and valves constructed in accordance with the present invention provide co-operating seating surfaces which are highly resistant to corrosion and erosion. The nongalling characteristics remain unimpaired under a wide range of conditions including erosive and corrosive conditions and operation at elevated temperatures or normal temperatures. Although the galling tendency exhibited by steel valves is not present in uncoated cast iron valves, this alloy coating can also be applied to iron valves for increasing the corrosion resistance and erosion resistance of such valves.

The invention may also be applied to the type of plug valve shown in the application for Letters Patent of Sven J. Nordstrom, Serial No. 691,213, filed September 27, 1933, for Valve, and now Patent No. 2,177,873 issued October 31, 1939.

The present invention contemplates applying the alloy coatings to plug valves of other metals for high temperature services, such as stainless steels or other alloy steels which form a good bond thereto.

What I claim as my invention and desire to secure by Letters Patent is:

1. A plug valve comprising a steel body having a seat therein, a steel plug in said seat in sliding contact therewith and having a coating on at least one of the seating surfaces of the valve of a hard nongalling, cobalt-chromium-tungsten alloy which retains its non-galling property at temperatures at or above about 500° F.

2. A plug valve comprising a steel casing having a seat therein coated with a hard nongalling cobalt-chromium-tungsten alloy, and a steel plug in said seat in sliding contact therewith having a coating of hard nongalling cobalt-chromium-tungsten alloy on its seating surface.

3. A plug valve comprising a body of chromium nickel steel having a seat therein and a plug of chromium nickel steel in sliding contact therewith, at least one of the seating surfaces of the valve being coated with a hard nongalling cobalt-chromium-tungsten alloy.

GEORGE F. SCHERER.

CERTIFICATE OF CORRECTION.

Patent No. 2,208,394.                                             July 16, 1940.

GEORGE F. SCHERER.

It is hereby certified that error appears in the printed specification of the above numbered patent requiring correction as follows: Page 1, second column, line 47, in the table, fourth column thereof, for "6.10" read -- 6-10 --; and that the said Letters Patent should be read with this correction therein that the same may conform to the record of the case in the Patent Office.

Signed and sealed this 11th day of February, A. D. 1941.

(Seal)                                                                           Henry Van Arsdale,
                                                                                    Acting Commissioner of Patents.